(12) United States Patent
Malireddy et al.

(10) Patent No.: US 11,379,191 B2
(45) Date of Patent: *Jul. 5, 2022

(54) PRESENTATION ORIENTED RULES-BASED TECHNICAL ARCHITECTURE DISPLAY FRAMEWORK

(71) Applicant: JPMorgan Chase Bank, N.A., New York, NY (US)

(72) Inventors: Srinivasa Reddy Malireddy, Hillsborough, FL (US); Michael Paul Ward, Hillsborough, FL (US); Philip John Waldorf, Hillsborough, FL (US); Kevin Michael Burns, Hillsborough, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/147,129

(22) Filed: May 5, 2016

(65) Prior Publication Data

US 2017/0322777 A1     Nov. 9, 2017

Related U.S. Application Data

(63) Continuation of application No. 14/055,148, filed on Oct. 16, 2013, now Pat. No. 9,342,541.

(51) Int. Cl.
    *G06F 8/34*          (2018.01)
    *G06Q 40/00*        (2012.01)
    *G06F 9/445*        (2018.01)

(52) U.S. Cl.
    CPC ............ *G06F 8/34* (2013.01); *G06F 9/44526* (2013.01); *G06Q 40/00* (2013.01)

(58) Field of Classification Search
    CPC ........ G06F 8/20; G06F 11/30572; G06F 8/34; G06F 9/44526; G06Q 40/00

(Continued)

(56) References Cited

U.S. PATENT DOCUMENTS 5,850,446 A * 12/1998 Berger ................ G06Q 20/027
                                                                    705/79
7,647,273 B1 * 1/2010 Hill ...................... G06Q 40/025
                                                                    705/38

(Continued)

OTHER PUBLICATIONS

Kong et al., "Event-driven service coordination for business process integration in ubiquitous enterprises", 2009, [Online], pp. 14-26, [Retrieved from interneton Feb. 7, 2022], <https://reader.elsevier.com/reader/sd/pii/S036083520800185X?token=982CF142AE7E3F188AE6FF222D2DF0CDC3D3A1A2494747351BED44425> (Year: 2009).*

*Primary Examiner* — S. Sough
*Assistant Examiner* — Zengpu Wei
(74) *Attorney, Agent, or Firm* — Greenblum & Bernstein, P.L.C.

(57) ABSTRACT

An improved computer system and method for the publication of business content using a metadata framework that provides for rapid development, encapsulated and extensible functionality, and simplified communication with a wide variety of systems, each of which may support multiple data formats. The system includes an interface and formatting engine configured for identifying data related to a service in data fields in a service request and a control engine for selecting and executing at least one executable code module based on the service request and generating a user interface for display at a client system. The user interface includes a financial transaction field, an amount-of-transaction field, a payee field, a payor field, and a date field.

22 Claims, 12 Drawing Sheets

(58) Field of Classification Search
USPC .......................................................... 717/103
See application file for complete search history.

(56) References Cited

U.S. PATENT DOCUMENTS

| | | | | |
|---|---|---|---|---|
| 7,945,469 | B2* | 5/2011 | Cohen | G06Q 30/0601 |
| | | | | 705/7.14 |
| 8,572,677 | B2* | 10/2013 | Bartholomay | G06F 9/45558 |
| | | | | 726/1 |
| 8,768,838 | B1* | 7/2014 | Hoffman | G06Q 40/00 |
| | | | | 705/44 |
| 2003/0009366 | A1* | 1/2003 | Haber | G06Q 10/10 |
| | | | | 705/80 |
| 2006/0053083 | A1* | 3/2006 | Wiest | G06Q 30/02 |
| | | | | 705/80 |
| 2006/0106675 | A1* | 5/2006 | Cohen | G06Q 30/0601 |
| | | | | 705/26.1 |
| 2007/0073685 | A1* | 3/2007 | Thibodeau | G06Q 40/00 |
| 2009/0006142 | A1* | 1/2009 | Orttung | G06Q 10/02 |
| | | | | 705/5 |
| 2010/0030604 | A1* | 2/2010 | Cummins | G06Q 10/0633 |
| | | | | 705/7.27 |
| 2010/0082481 | A1* | 4/2010 | Lin | G06Q 40/00 |
| | | | | 705/41 |
| 2011/0191145 | A1* | 8/2011 | Ford | G06Q 10/0639 |
| | | | | 705/7.38 |
| 2012/0137235 | A1* | 5/2012 | T S | G06F 8/38 |
| | | | | 715/763 |
| 2012/0203877 | A1* | 8/2012 | Bartholomay | H04L 41/0813 |
| | | | | 709/221 |
| 2012/0324039 | A1* | 12/2012 | Hirana | G06F 9/5077 |
| | | | | 709/215 |
| 2013/0018662 | A1* | 1/2013 | Dubbels | G06F 19/321 |
| | | | | 705/1.1 |
| 2013/0173472 | A1* | 7/2013 | Trolio | G06Q 20/102 |
| | | | | 705/44 |
| 2014/0006231 | A1* | 1/2014 | Salgueiro | G06Q 30/04 |
| | | | | 705/30 |
| 2015/0073990 | A1* | 3/2015 | Aliprandi | G06Q 20/389 |
| | | | | 705/44 |
| 2016/0189117 | A1* | 6/2016 | Sandraz | G06Q 20/20 |
| | | | | 705/16 |
| 2018/0365608 | A1* | 12/2018 | Powell | G06F 9/50 |

* cited by examiner

Transaction:

Date:

Amount:

Payor:

Payee:

Description:

FIG. 5

| MER_NAME | MER_TYPE | MER_SEQ | MER_RULESET | MER_FUNC_PASS | MER_EXIT_PASS | MER_FUNC_FAIL |
|---|---|---|---|---|---|---|
| VALIDATE | VALID | 1 | ACCOUNT_EXIST | load_account_details() | | ERRORMSG |
| AVAILU | UPDATE | 2 | AAT-KEY-EXISTS-RS | | | ERRORMSG |

FIG. 8

| MRS RULESET | MRS DESCRIPTION |
|---|---|
| AAT-AVAIL-ATS-EDIT | AVAIL EDIT MUST BE GREATER THAN SPACES |
| AAT-KEY-EXISTS-RS | BOOKING OFFICE ALREADY EXISTS |
| AAT-KEYS-ENTRY-RS | MUST HAVE VALID ENTRY FOR BOOKING OFFICE |
| ACCOUNT EXIST | ACCOUNT IDENTIFIED MUST EXIST |

FIG. 9

| MRU_RULESET | MRU_RULE_LEVEL | MRU_RULE_SEQ | MRU_FIELD_ID | MRU_OPERAND | MRU_VALUE |
|---|---|---|---|---|---|
| ACCOUNT_EXIST | 1 | 1 | 770 | EQ | ACCOUNTID-EXISTS |
| ACCOUNT_EXIST | 2 | 1 | 878 | EQ | USERID-EXISTS |
| ACCOUNT_EXIST | 2 | 2 | 69 | NE | DISBURSEMENT-INVALID |

If AccountID Exists
Or UserID Exists
And Disbursement Not Invalid
   'Pass Function defined in Execute-Rulset table will be executed'
Else
   'Fail Function defined in Execute-Ruleset table will be executed'

FIG. 10

PRESENTATION ORIENTED RULES-BASED TECHNICAL ARCHITECTURE DISPLAY FRAMEWORK

REFERENCE TO RELATED APPLICATIONS

The present application claims priority to, and is a continuation of, U.S. patent application Ser. No. 14/055,148, filed on Oct. 16, 2003, entitled, "Presentation Oriented Rules-based Technical Architecture Display Framework," which is incorporated herein by reference in its entirety.

FIELD OF THE INVENTION

Embodiments of the present invention are generally directed to systems and methods for implementing a mainframe application framework including those utilized in business-oriented content publication and manipulation environments.

BACKGROUND OF THE INVENTION

While mainframe systems utilized in the business environments of today may be capable of handling a wide variety of both simple and complex tasks, any modifications that are to be made to these systems, including those providing new or enhanced functionalities, often carry long, costly, and tedious development cycles. Manual coding is often required, for example, when mainframe systems are modified to process service requests from new client-side systems utilizing unique communication formats or to retrieve data from databases with unsupported data formats.

Additional development may also be required where business rules must be created or altered. This is because in many modern mainframe systems, business rules are embedded within the operating code of the system, thereby requiring manual modifications to the code whenever business rules must be updated to comply with current business needs, regulatory requirements, or other rules. Similarly, code development must be undertaken when new user interfaces are required, including modifying the look and feel of the user interfaces and the data fields that are displayed.

For all of these reasons and others, modern mainframe systems often contain repetitive code fragments across the system with minor differences. As a result, when maintenance is required, the development cycle and costs are further expanded as each code fragment must be updated manually. The fragmented system development also leads to inconsistent data update and auditing across the system modules and inconsistent or incompatible cross-system communications.

Therefore, a solution is needed that simplifies the mainframe application framework for content publication and manipulation by improving current framework structures and designs to overcome these and other deficiencies.

SUMMARY OF THE INVENTION

Accordingly, an improved mainframe application framework system and method for the publication and manipulation of content is disclosed that provides for rapid development, encapsulated and extensible functionality, and simplified communication with a wide variety of systems, each of which may support multiple data formats.

In one aspect of the invention, a computer system for publishing business content using a metadata framework is disclosed comprising a code module, a plurality of communication interfaces, a formatting engine and a control engine. Specifically, the control engine is configured to define a communication memory area in response to receiving a service request from a client system via one of the plurality of communication interfaces and to process the service request. In a preferred embodiment, the control engine processes the service request by executing a plurality of business rules based on the service request, where the execution of the business rules further causes executable code modules to be selected and executed. In addition, the control engine generates a user interface base and furthermore, generates a response based on the processing of the service request and the user interface that is generated.

In another aspect of the present invention, a method for publishing business content using a metadata framework is disclosed. A service request is received from a client system via communication interfaces and the data format of the service request is detected. Then, in response to receiving the request, a communication memory area is defined within memory. The service request is processed by executing a business rule based on the service request by causing a processor to execute one or more executable code modules. In addition to processing the service request, a portion of a user interface for display at the client system is generated. Finally, the service request response is generated.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 5 is a user interface displayed to a user in accordance with an embodiment of the invention.

FIG. 8 depicts an exemplary execute-ruleset table in accordance with an embodiment of the invention.

FIG. 9 depicts an exemplary ruleset table in accordance with an embodiment of the invention.

FIG. 10 depicts an exemplary rules table in accordance with an embodiment of the invention.

DETAILED DESCRIPTION OF THE INVENTION

An improved mainframe application framework system and method for the publication and manipulation of content is disclosed that provides for rapid development, encapsulated and extensible functionality, and simplified communication with a wide variety of systems, each of which may support multiple data formats. In one preferred embodiment, the system is developed in z/OS Model-View-Controller (MVC) design. Furthermore, embodiments encapsulate communication protocols, including, XML, JSON, and others.

Figure 1:
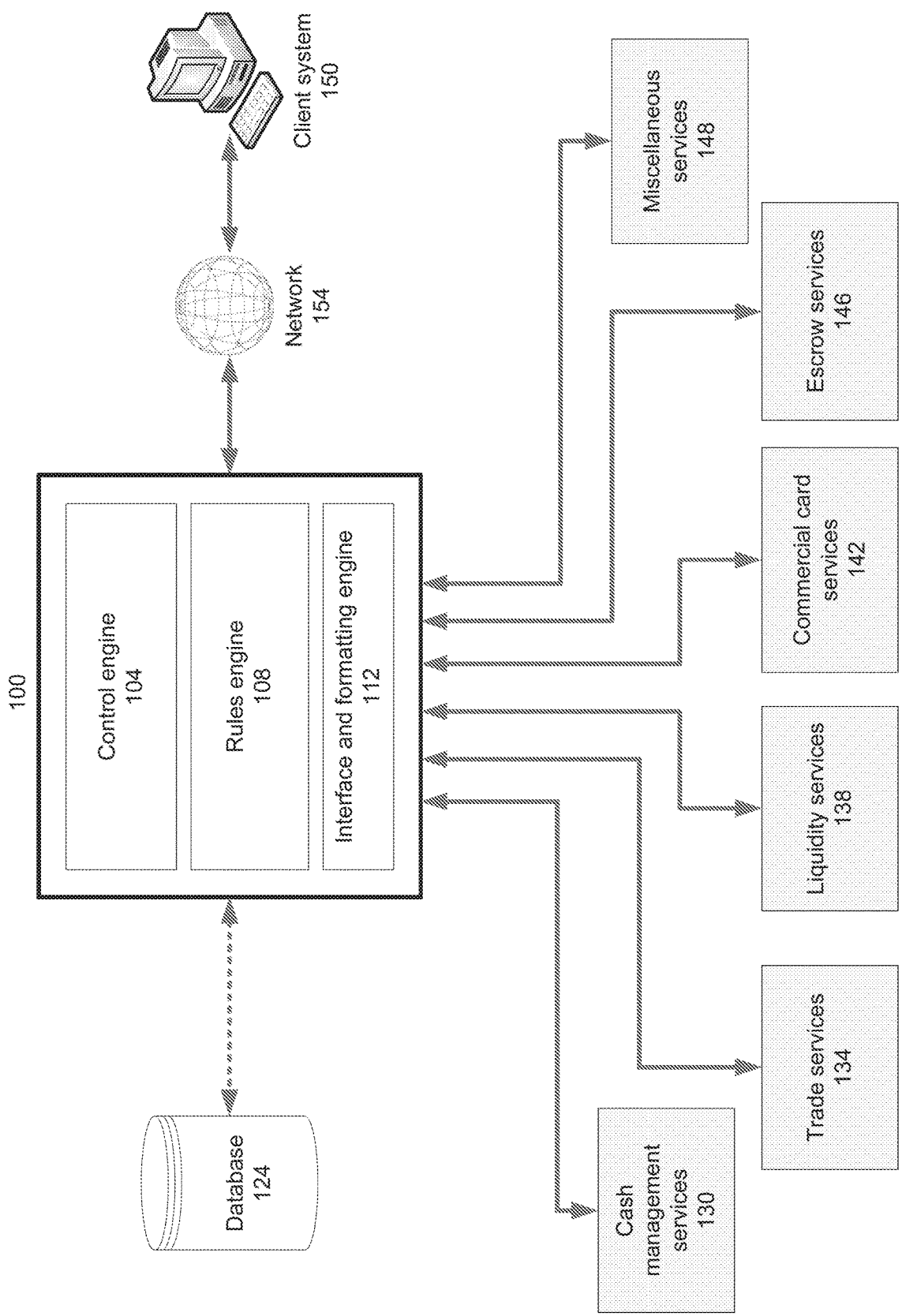
FIG. 1 is a block diagram depicting a business mainframe system for content publication and service processing in accordance with an embodiment of the present invention.

Embodiments of the present invention support robust management and use of metadata through the use of rules. FIG. 1 depicts a business mainframe system 100 for content publication and service processing in accordance with an embodiment of the present invention. The business mainframe system 100 includes a control engine 104, a rules engine 108, and an interface and formatting engine 112. In the preferred embodiments, the business mainframe system 100 may further include, or at least have access to, a database 124. Because the database 124 may be a part of the business mainframe system 100 or separate from the system (e.g., residing externally), the database 124 is depicted with dashed lines in FIG. 1. The business mainframe system 100 may store, manage, and deliver business data to a requesting client system 150 via network 154. In addition, the mainframe system 100 may connect to a plurality of computer services systems 130-150 that provide numerous services. In this example, the computer services systems 130-150 provide financial services and may be existing computer services systems already operating at a financial institution, such as a bank.

In at least one embodiment, the business mainframe system 100 manages client financial data and transactions, facilitates the processing of financial transactions and payments of the clients, and ensures compliance with auditing, regulatory and business rules. Thus, in these embodiments, the business mainframe system 100 receives business requests from systems and terminals of a business related to cash management, trade, liquidity, commercial card, escrow, and other services that may be provided by the business mainframe system 100. The business requests may cover any type of business needs and may vary from simple to complex. For instance, the service requests may be a related to: automated clearing house, check disbursements, commercial cards, cross-currency payment services, electronic payables, healthcare link for payers, order-to-pay, payment fraud prevention, prepaid cards, self-serve inquiry and resolution management, documentary collections, open account processing, purchase order management, trade document preparation, bank payment obligation, bank-to-bank reimbursements, standby letters of credit, cash consolidation, investments, and others. It should be readily apparent that the presently disclosed invention need not be limited to these types of services or to finance but may be modified by persons of ordinary skill in the art to be implemented in a wide range of industries including any business and institution that would benefit from systems and methods disclosed herein. The inventive methods and systems apply generally, without regard to the specific choice of the delivery of the graphical user interface.

Figure 2:
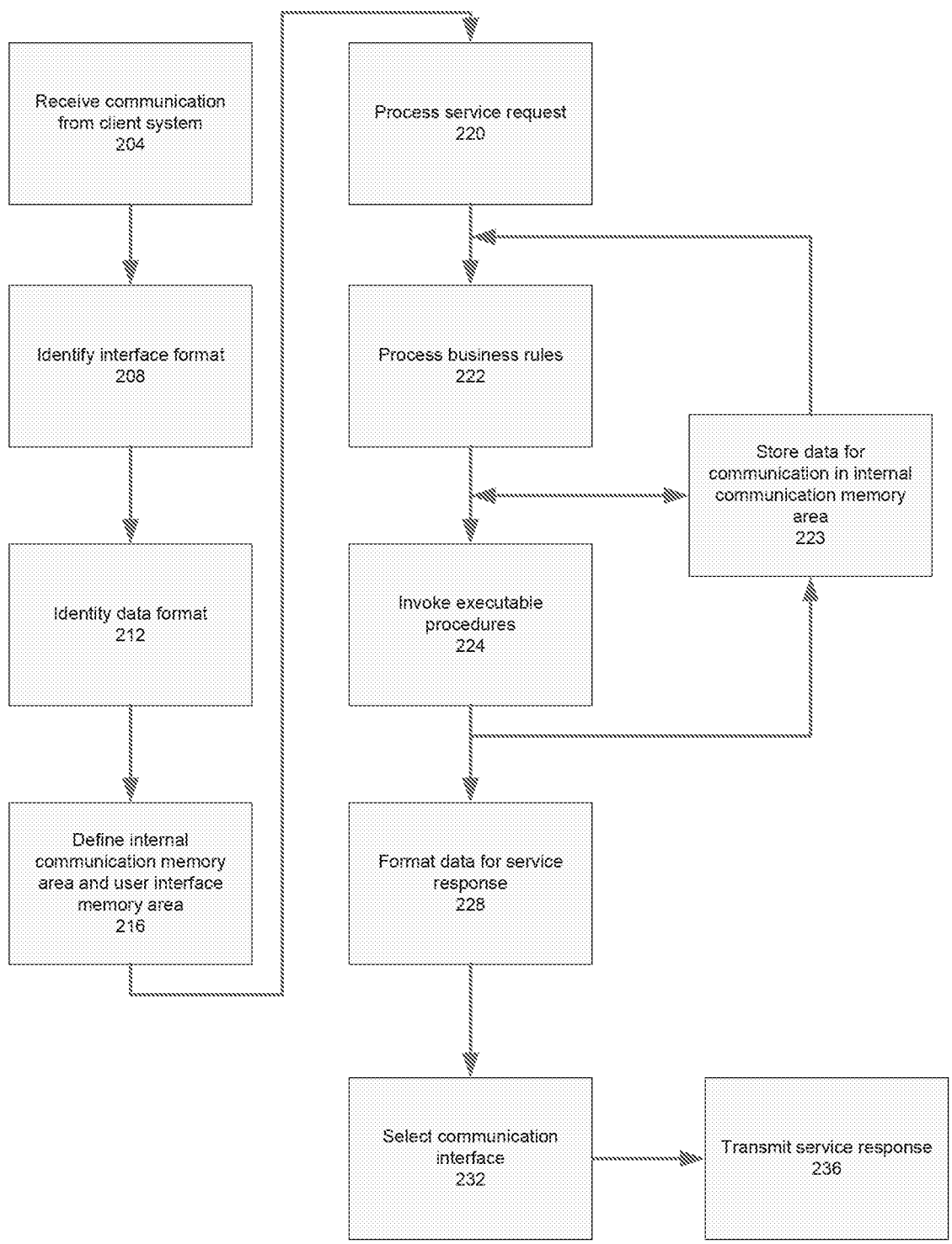
FIG. 2 depicts a flowchart of a method for receiving and processing service requests in accordance with an embodiment of the present invention.

The capabilities of the business framework system 100 will now be described in the context of servicing a service request. FIG. 2 depicts a flowchart of a method for receiving and processing service requests in accordance with an embodiment of the present invention. At step 204, a communication is received from client system 150. This communication, in this example, includes a request for data of a financial transaction record 1234, including date, transaction amount, payee, payor, description and other data.

Communications between the client system 150 and the business framework system 100, in the preferred embodiment, are facilitated by the interface and formatting engine 112, which may support service requests in a plurality of interface formats. In the preferred embodiment, the interface and formatting engine 112 supports communications made in CICS, SOAP Web Service, RESTful Web Service, MQ, DB2 interface formats, along with others. At step 208, the interface and formatting engine 112 identifies the interface format of the request received from client system 150 at step 204. Additional data related to the interface format may be collected from the communication, along with other metadata, such as information related to the source of the communication.

The system 100 further has access to a library of plugins that provides additional support for any number of interface formats. These plugins may allow the system to identify and process the requests in circumstances where the system does not natively support an interface format. Therefore, a customizable library of plugins may be utilized to further expand the capabilities of the system, as desired. In one embodiment, the system 100's library includes plugins that provides system support for SOAP web services, Restful web services, and z/OS Web sphere. The system 100 may natively support CICS 3270 and DB2 interface formats.

Moreover, in one embodiment, data associated with the client may be detected and retrieved from a preference database. In this embodiment, the interface and formatting engine 112 may have access to client communication preference data, which may facilitate the processing of the communication. This data, for instance, may describe client systems' supported interface/communication protocols, data format, communication preferences, business rules for execution and other information.

The interface and formatting engine 112 further processes the request to identify and parse data contained therein. In a preferred embodiment, the interface and formatting engine 112 supports data in CICS 3270, XML, JSON, and DB2 Record Set formats. The interface and formatting engine 112, thus, at 212, detects the format of the data including the data fields and proceeds to parse the data to identify relevant data. The data contained therein, may then be communicated to the control engine 104 for processing.

In one embodiment, the interface and formatting engine 112 may utilize client communication preference data in parsing the client communication. Based on this client communication preference data, the interface and formatting engine 112 may parse the communication to identify the service request type and collect information of the request (e.g., data of data fields that are to be collected), as defined by the client communication preference data.

The relevancy of data fields may be based on service request types, source of request, or other information. For instance, the preference data may define five relevant data fields that should be collected for the service request type of the service request in question. In one embodiment, the system may discard extraneous data that are not identified by the client communication preference data. This may improve the speed and efficiency of service request processing at the business framework system 100. The client communication preference data, in one embodiment, is stored at the database 124 and is configurable by an administrator and/or the clients themselves. It should be readily apparent to persons of ordinary skill in the art that embodiments of the present system may support any other formats and interfaces that are currently known. Furthermore, the interface and formatting engine may be further modified to support formats and interfaces that are developed in the future as necessary.

At step 216, the control engine 104 dynamically defines an internal communication memory portion and user-interface memory portion within memory of the system 100 for the service request received. In one embodiment, the internal communication memory portion and user-interface memory portion are dynamically defined based on the incoming request type and the business and default rules associated to the request.

As the system executes business rules and executable procedures (as described below), data that is utilized during the processing of the service request and data that is retrieved and calculated during the execution may be stored in the internal communication memory portion. The data stored at internal communication memory portion may then be accessed by subsequent procedures that are executed by the control engine. Therefore, this memory portion operates as a central location for important data. In this manner, the portion in memory is accessible to a plurality of engines during the processing of the service requests and beyond, providing efficient access to the data. One benefit gained from this implementation is that if new fields are added to the request or new rules are added, the data fields or rules may be added to the internal communications portion without requiring manual modification of the underlying programming code defining internal communications.

The data stored at user-interface memory portion defines the look and feel of the user interface that would be displayed to a user at client system 150. In response to communication from a requesting client system 150, the engines of the system 100 build the look and feel of the user interface at client system 150 based on the service request, the client system 150 and other configuration and administrative requirements. Data responsive to the service request, as discussed further below, are inserted into portions of this memory portion. With this implementation, the data stored thereat can then be interpreted by a run-time engine to display the user interface to users.

The control engine 104, at 220, processes the request by processing business rules at 222 and invoking one or more system procedures residing at the business framework system 100, at 224. The control engine 104 may invoke system procedures based on the parameter contained in the service request, which may describe the request originated by the client system 150. In the instant exemplary service request-a request to retrieve data of a transaction 1234—the parameter data may identify the particular record desired, such as the identifier number (e.g., "1234"). The service request may also identify the data fields requested (e.g., "date," "tAmount," "payee," "payor," etc.). In many instances, the service request need only define service request type and identify data essential to fulfill the request. The request would not need to identify data fields or define the interface to be returned to the user. Instead, the data that should be returned, the look and feel of the user interface, and other configuration options may be managed by the system 100 in preference data.

Figure 3:
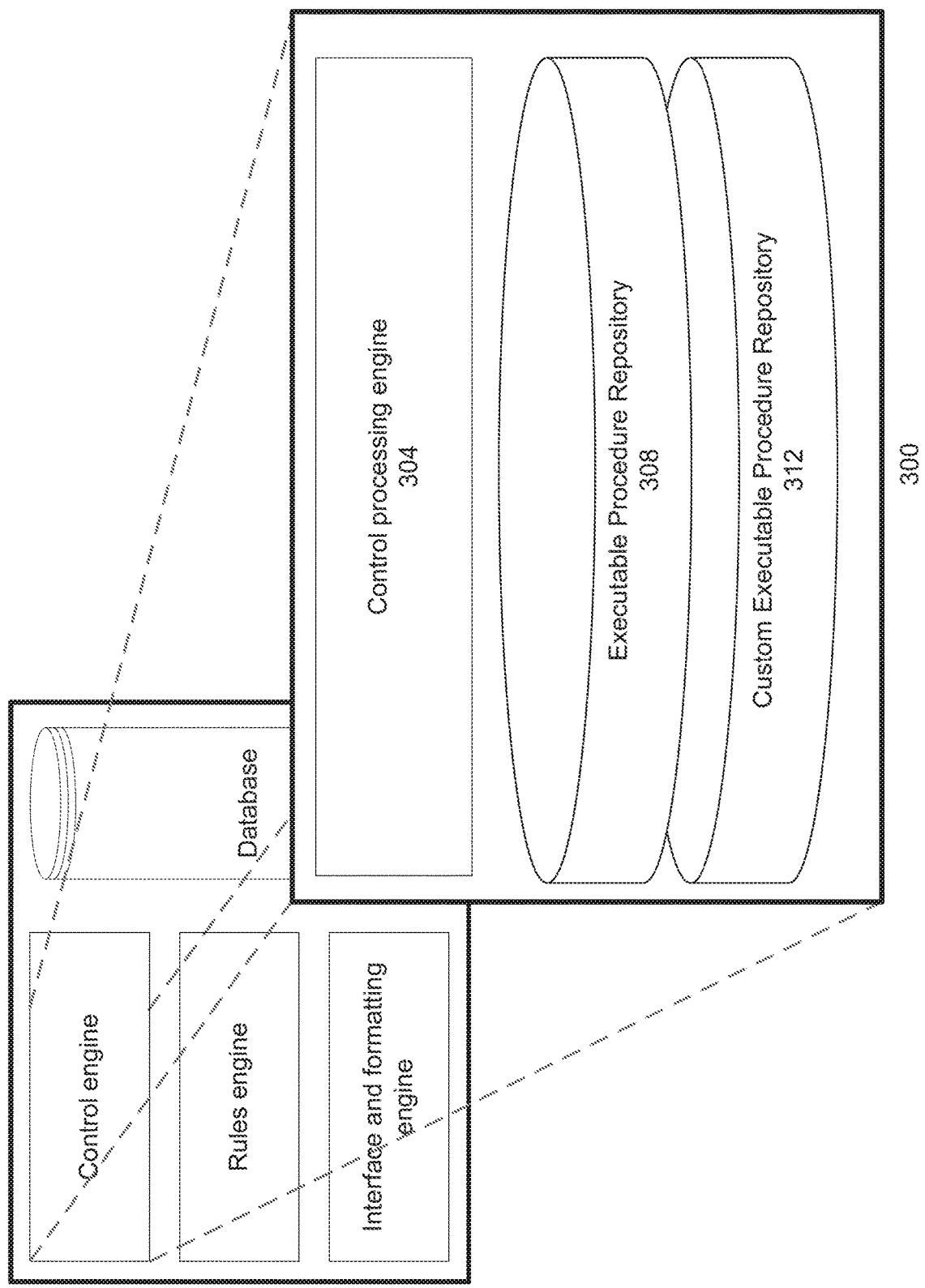
FIG. 3 is a detailed block diagram depicting a control engine in accordance with this embodiment of the present invention.

At 224, the control engine 104 selects and executes one or more procedures stored at the system based upon the request type of the request received. FIG. 3 depicts a detailed block diagram of the control engine in accordance with this embodiment of the present invention. The control engine 300 includes a control processing engine 304, an executable procedure repository 308, and a custom executable procedure repository 312. By identifying the service request received at the control processing engine 304 to be a request for data of a record 1234, the control processing engine 304 may identify and invoke a plurality of executable procedures stored at procedure repository 308 in fulfilling the service request.

For instance, the control processing engine 304 may invoke a retrieve_transaction_record( ) procedure stored at the executable procedure repository 308. Upon the execution of the retrieve_transaction_record( ) function, the control processing engine further 304 causes the processor(s) of the system to access the database 124, locate data describing transaction "1234," and to retrieve and store the transaction data at internal communication memory portion 316, at 223. Any number of procedures may be invoked to cause any variety of operations.

Along with the standard create-, retrieve-, update-, delete-type operations stored at procedure repository 308, the procedure repository 308 may further include procedures for communicating with internal and external systems. Where the business framework system, as here, is implemented in the financial services industry for example, the operations may cause the completion of simple to complex tasks related to financial transactions and data. For instance, one or more procedures may cause the completion of a bank transfer, the automated generating and transmittal of a financial disclosure letter; the generation or renegotiation of loans; the purchasing or selling of stock or securities; the increase of a customer credit line; the setting of an account alert; the updating of a credit relationship, and others.

The executable procedures that are invoked by the control processing engine 304, in a number of embodiments, are driven by metadata-based rules. The business rules may define business assessments that must be satisfied before an executable procedure is invoked for execution. For instance, a business assessment may include determining that a user identification value is valid or a disbursement amount is less than a $100,000. Business rules may be executed for all service requests, for specific types of requests (e.g., for a transaction retrieval request, or investment transaction completion request), for specific clients (e.g., client ABC or clients having a portfolio worth over 50 million dollars, clients incorporated in Massachusetts), for specific time frames, for requests having particular parameters (e.g., requests related to transactions with value over 1 million dollars), and for other requests or procedures based on any desired attribute.

It should be readily apparent to persons of ordinary skill in the art that in various embodiments of the present invention, administrator, clients and various other users may customize the system to respond to and perform desired actions for any specific type of request, transaction, and client. Any number of attributes may be utilized to define the scope of the business rule and need not be limited to attribute related to the request, transaction, client or other client data, but may further be based on other data such as system performance and status data, temporal data, financial market data, time and date data, country data, system operator data, and so on. These rules are dynamically processed and, in the preferred embodiment, are instantly activated upon creation.

In addition, the control processing engine 304 invokes procedures to generate one or more user interfaces for display at the client system 150. Thus, the control processing engine 304 may further identify that a procedure generate_transaction_interface( ) procedure stored at the procedure repository 308 should be executed subsequently, using the retrieved data to generate the user interface. The data generated from the invoking of the generate_transaction_interface( ) may then be stored at the user-interface memory portion.

Figure 4:
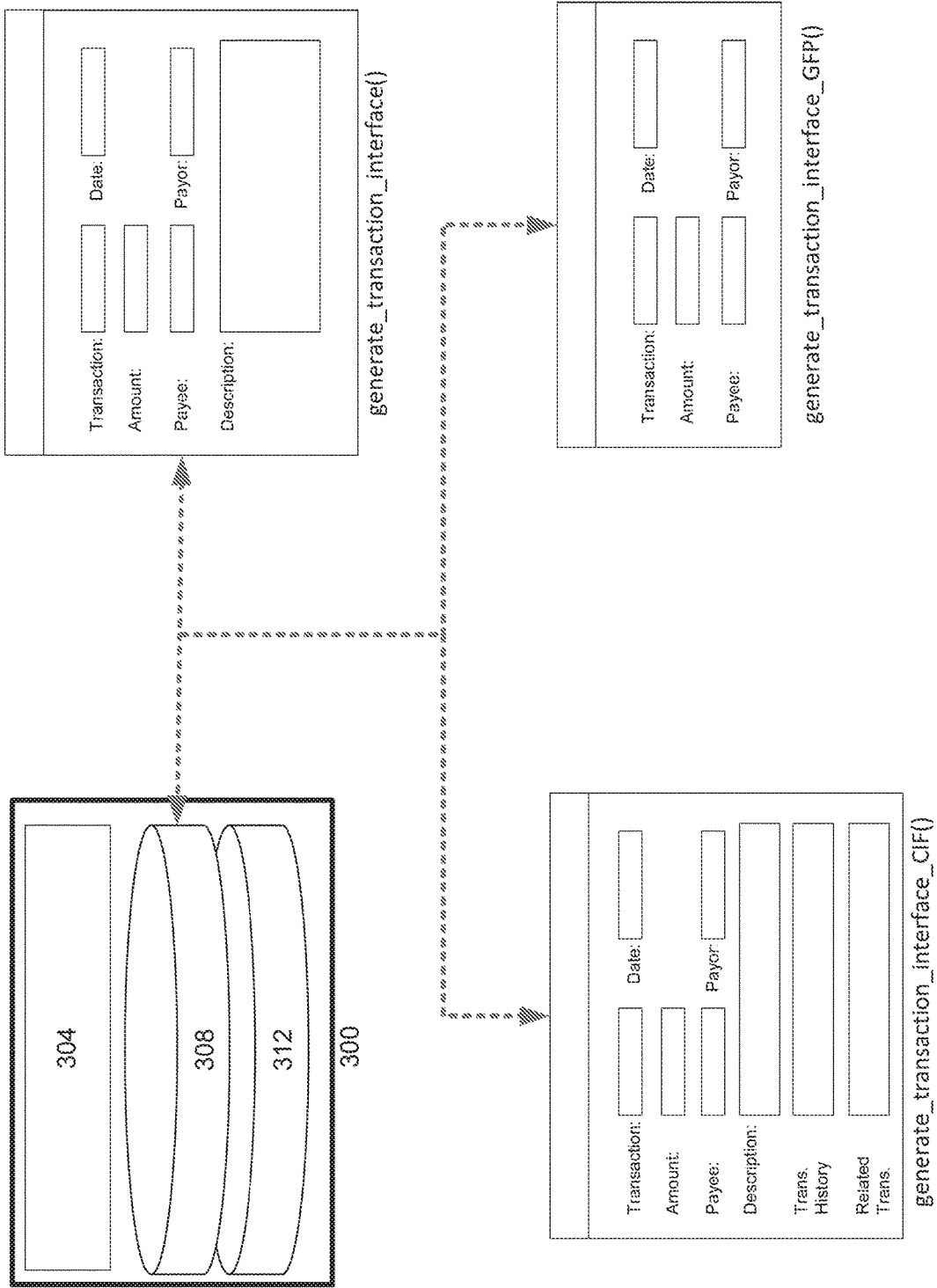
FIG. 4 is a diagram illustrating a function of a control engine in accordance with this embodiment of the present invention.

The control processing engine 304 may select from one of a plurality of procedure versions, each of which may perform the same core function, but may support different data types and/or produce different outputs. For instance, as visualized in FIG. 4, an embodiment of the control processing engine may select from one of three different generate_transaction_interface( ) functions. While all of the generate_transaction_interface( ) procedures may all provide for the generation of a user interface providing details of records, the user interface generated by the generate_transaction_interface_CIF( ) function may further includes data describing historical data and related transactions while the generate_transaction_interface_GFP( ) function only include transaction date, amount, and payee/payor information. In one preferred embodiment, custom procedures are stored at the custom procedure repository 412. The procedures that are selected for execution may be based upon the client and the service request.

After the control engine 104 has completed processing the service request, a service request response is prepared in response to the results of the processing. In one embodiment, in addition to data that is responsive to the service request (i.e., date, transaction amount, payee, payor, description and other data of transaction 1234), data stored at the user-interface memory portion 320 (i.e., data describing the user interface for display to the user at client system 150) is provided with the service request response. Thus, in at least one embodiment, the data stored at the user-interface memory portion 320, when processed by the client system 150 provides a user interface that includes the results of the service request (i.e., date, transaction amount, payee, payor, description and other data of transaction 1234).

At 228, this data is prepared for communication to the client system. The interface and format engine 112, specifically, formats the data according to a format preferred, or at least supported, by the client system 150, which may be in or more of the following formats: CICS 3270, XML/JSON, DB2 Record Sets. Other formats, of course, may be utilized. The desired format or operations undertaken by the control engine 104 may be defined in the service request communication (e.g., as received at step 204) or may be stored in the preference data. In addition to standard formats and operations, a client system 150 may further invoke additional operations or custom formats through one or more API functions.

At 232, the formatted data is transmitted by selecting one or more interfaces through which the formatted data will be communicated. Therefore, at 228, the interface and format engine 112 may prepare a communication response according to one or more interface formats, such as CICS 3270, SOAP Web Service, Restful Web Service, DB2, and others that may be customized and/or defined by the client system 150.

At 236, the formatted data is transmitted to the client system 150, where it is processed to cause the display of a user interface that provides the result of the service request. FIG. 5 provides an exemplary user interface displayed at the client device 150, providing the user at the client system 150 with details of transaction 150, including date, transaction amount, payee, payor, and description data.

Figure 6:
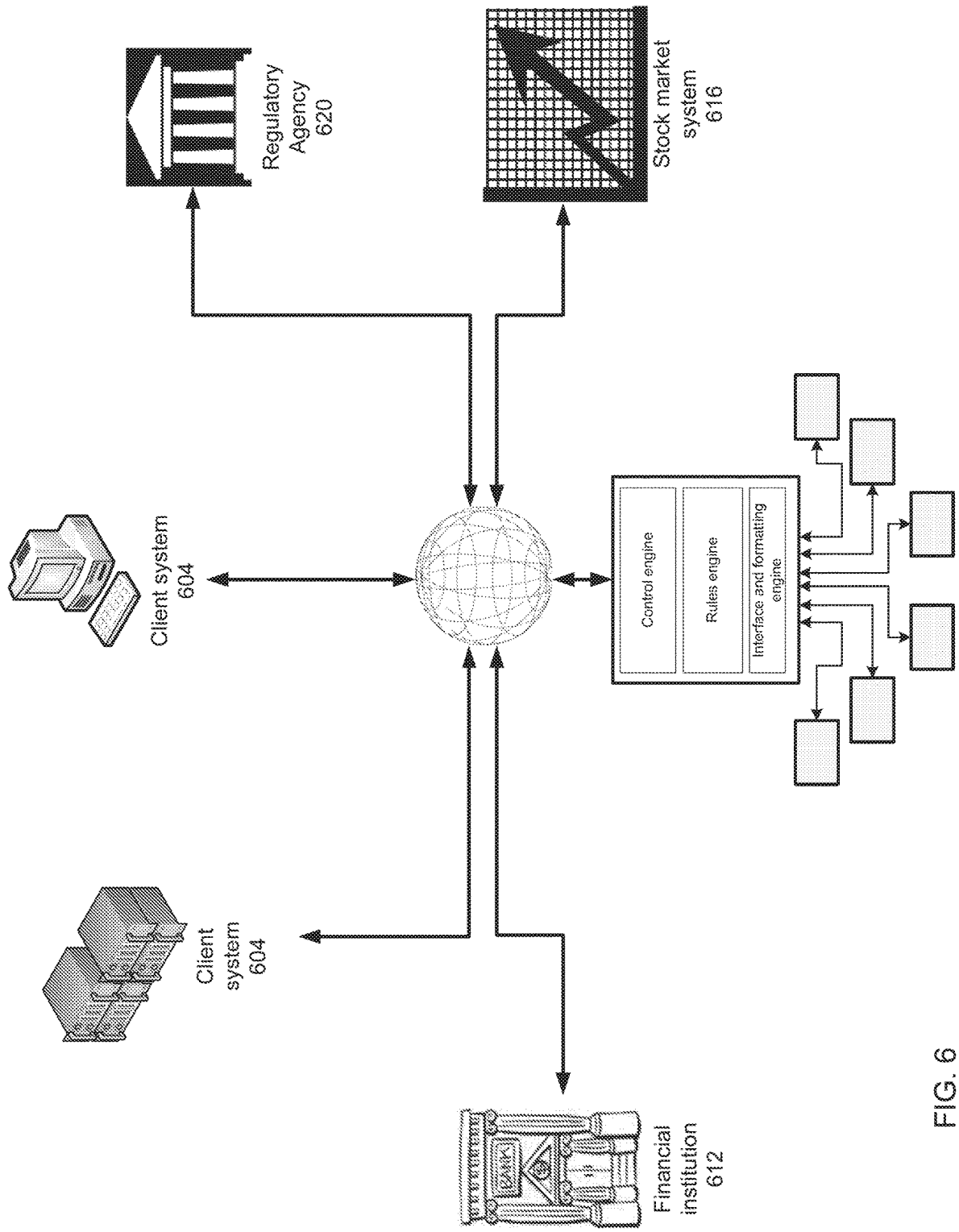
FIG. 6 is a block diagram depicting a working environment of the business mainframe system for content publication and service processing in accordance with an embodiment of the present invention.

FIG. 6 depicts a working environment of the business framework system in accordance with an embodiment of the present invention. The business framework system 600 may connect to client system 604 and 608, financial institution 612, stock market 616, and regulatory agency 620. The business framework system 600 may be connected to these and other systems via network 624, which may include the Internet.

The system's connection to other systems and terminals internal and external to a company allow the system to handle a plurality of requests received from many different clients. These requests, in the preferred embodiment, may be processed concurrently at the system. Each of the clients, of course, may have different business needs and requirements. Therefore, in processing the requests, the procedures invoked, and the rules that are processed by the business framework system 600 may differ for a service request received from client system 604 to a request received from client system 608. Furthermore, the user-interface that is provided to a user at client system 604 and 608 may differ as well, including the data and format of the data that is displayed in such user interfaces.

The business framework system 600 may connect to the financial institution 612 to complete any number of actions that may be responsive to a service request. Financial institution 612, for example, may be a bank that manages one or more financial accounts for clients of client systems 604 and 608 or an account of a third party (e.g., a corporation paying client of client system 604). Examples of actions may include transaction payments; completions of a bank transfer, account status and balance retrieval; and other operations, some of which are well known in the art.

Similarly, the business framework 600 may communicate with stock market 616 to complete a number of operations. For instance, the stock market 616 may be a computer system associated with the New York Stock Exchange (NYSE). The business framework system 600 may connect to the NYSE to complete investment-related transactions; to retrieve price or market data of one or more security symbols, to retrieve historical investment/trading data; and other operations.

In addition, business framework system 600 may connect to a regulatory agency 620 (e.g., Securities and Exchange Commission) to retrieve or submit company and financial security financial data and filings and to retrieve regulatory and auditing requirements.

Generally, it should be noted that the components depicted and described herein above may be, or include, a computer or multiple computers. Although the components are shown as discrete units, all components may be interconnected or combined. The components may be described in the general context of computer-executable instructions, such as program modules, being executed by a computer. Generally, program modules include routines, programs, objects, components, data structures, etc., that perform particular tasks or implement particular abstract data types.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system, terminals and other computers discussed herein may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

In addition, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or nonremovable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit). ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI, for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

The various embodiments and features of the presently disclosed invention may be used in any combination as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalent.

Embodiments of the business mainframe system are driven by metadata and parameters that, when processed at the business framework system, cause the system to invoke and process executable procedures stored at the system, thereby allowing code to be rapidly and dynamically used across functionality without costly development cycles, all the while minimizing code fragmentation. This further allows for functionality to be defined once and used anywhere with little cost.

More particularly, in at least some of these operations, system operations are driven by complex decision logic as defined by business rules. As part of the decision logic, these business rules may cause the engines of the system to perform constant and variables evaluations to determine procedures to invoke (as described above), to format data of data fields received at and outputted from the system, and execute default rules for a given service request. Complex business rules may be externalized in Natural Language, for example, and may be table driven. More complex rules may be defined in a COBOL or JAVA plugin as a global or local function. In one embodiment, an editing engine facilitates the editing of the rules by an administrator of the system and/or an administrator of a client.

Figure 7:
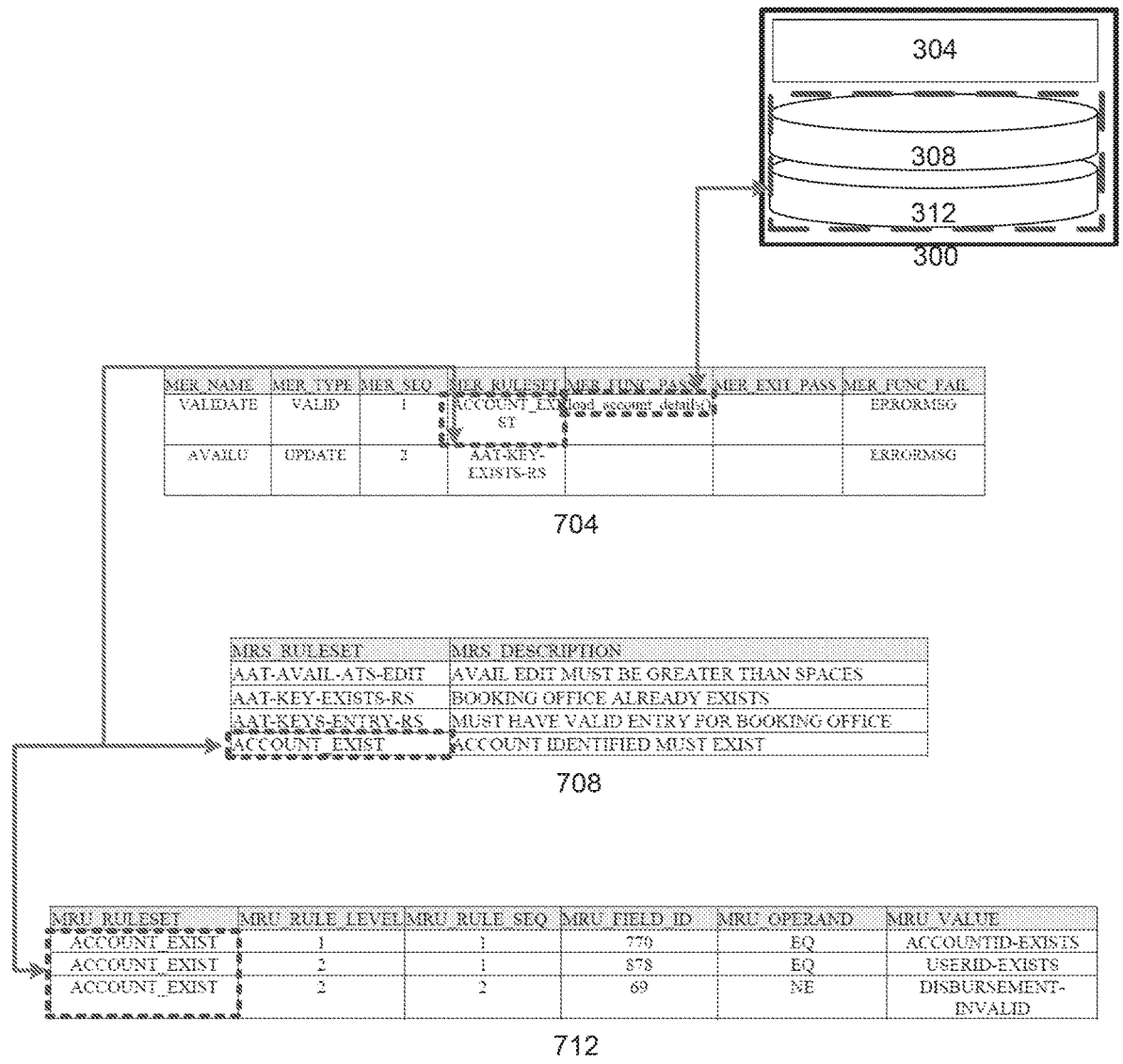
FIG. 7 is diagram depicting tables of metadata-based rules and their relationships, in accordance with an embodiment of the invention.

In some embodiments of the present invention, metadata business rules are defined and processed at the system using a plurality of rules tables. More particularly, in at least some of these embodiments, the rules are defined in a hierarchal set of tables: execute-ruleset table 704, ruleset table 708 and rules table 712, as depicted in FIG. 7. FIGS. 8, 9, and 10 depicts the execute-ruleset tables, ruleset tables and rules table in more detail.

Generally, rules in the rules table 712 represent specific evaluations that need to be performed, such as the evaluation of a constant or variable for a specific desired value (which may be defined by a business rule). The ruleset table 708 defines a plurality of ruleset objects. Each rule that is listed in the rules table is associated with one or more ruleset objects. In the exemplary tables shown in FIGS. 7-10, the first four rules in the rules table are associated with the same ruleset object called "ACCOUNT_EXIST," which is a ruleset that determines whether or not an account that was identified by a user as part of the service request exist within the database of the system. The invocation of the "ACCOUNT_EXIST" ruleset causes all of the rules associated with the ruleset to be evaluated, causing a result to be determined for each ruleset. For instance, the result for a ruleset can be either a "PASS" determination or a "FAIL" determination.

Generally, entries in the execute-ruleset tables 704 represents a task, or business rule that needs to be processed by the system in servicing a service request. Each entry in the table invokes one or more ruleset objects that are defined by the ruleset table, thereby invoking the rules of the ruleset objects. The table 704 further defines what procedures to take based on the results of the processed ruleset. For instance, a "PASS" result could cause the system to call upon an executable procedure stored at procedure repository 308 whereas a "FAIL" result could cause the system to return an error message.

Figure 11:
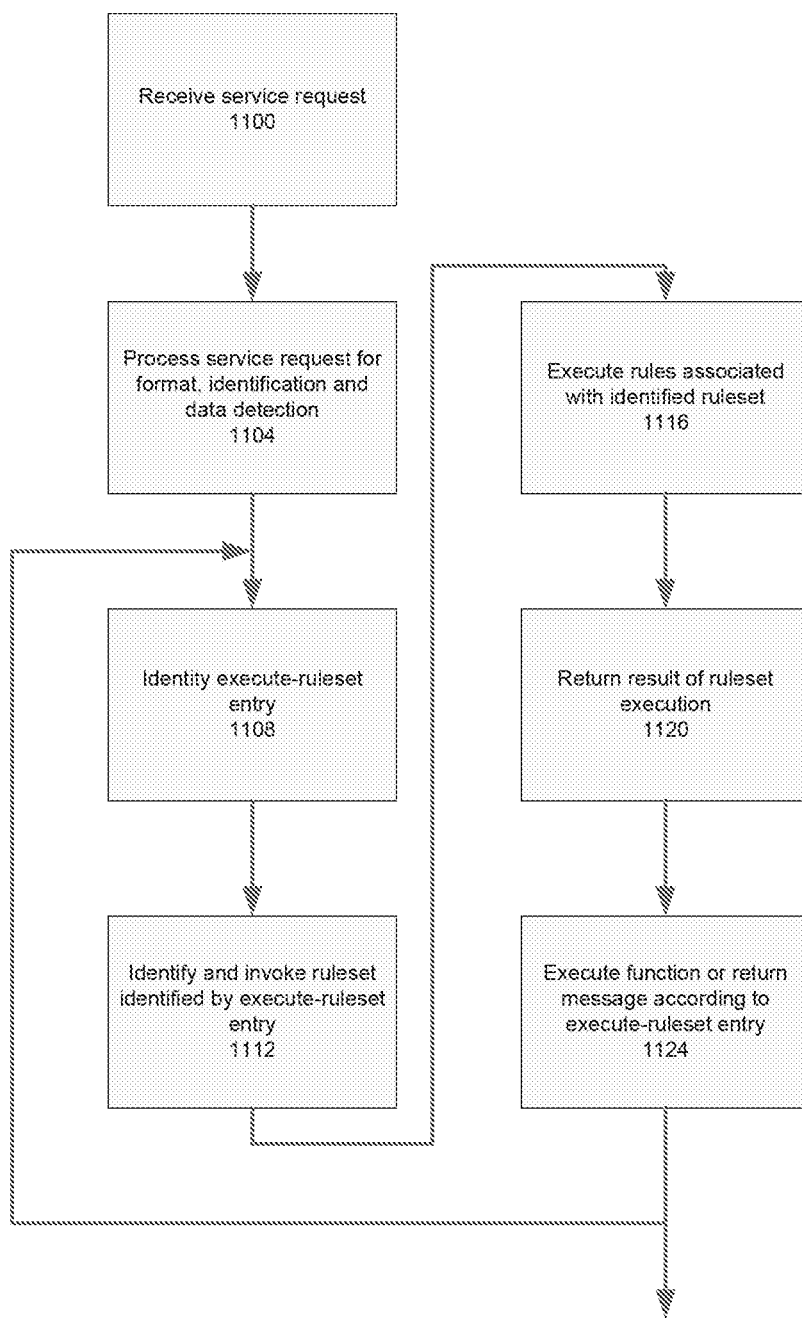
FIG. 11 depicts a method of processing a service request by evaluating metadata rules in accordance with an embodiment of the present invention.

The use of these tables will now be described in an example. Specifically, when a service request is received, one or more of the execute-ruleset entries may be evaluated based on the service request type, the client or other attributes. FIG. 11 depicts a method of processing a service request by evaluating metadata rules in accordance with an embodiment of the present invention. At 1100, a service request is received. At 1104, this service request is formatted, parsed and processed to identify the service request (e.g., operations discussed with reference to FIGS. 1 and 2 above). In this example, the service request is an inquiry for a disbursement status of checks that have been issued for an account 12345.

At 1108, the first execute-ruleset entry is identified for processing based on the service type identified. In some preferred embodiments, the system may contain default rules that are evaluated by default for a given request type. The identified execute-ruleset entry, called "LoadAccount", may load the data of the account 12345, including into an internal communication memory portion that has been defined for the particular service request. As seen in FIG. 8, the "LoadAccount" entry in the execute-ruleset table identifies that the "ACCOUNT_VALID" ruleset should be invoked. If the result of the ruleset is a "PASS," a function called load_account_details( ) is invoked, which will retrieve data of account 12345 from the database. In contrast, if the result of the "ACCOUNT_VALID" ruleset is a "FAIL," an error message will be returned (via an "ERRORMSG" ruleset). In other words, this execute-ruleset entry provides that the account details will be loaded if it is determined that the identified account is valid. Else, it will return an error message.

At 1112, the "ACCOUNT_VALID" ruleset is invoked. At 1116, the rules table is accessed and the rules associated with the "ACCOUNT_VALID" ruleset are executed. The rules table provides for a number of rules to be evaluated. The entries in the rules table may be defined in a manner that very complex logic and evaluations may take place. In the exemplary rules table provided in FIG. 9, rules are defined over several 'levels' of evaluation, where the successful evaluation of the rules on any particular level will return a "PASS" result for the ruleset object. Furthermore, within each level, a plurality of rules may be evaluated in a particular sequential manner by defining the sequence of evaluation within each level and the rules on these levels may be adjoined by operands (e.g., "AND", "OR", "XOR" and so on) to further allow complex evaluations to be performed.

FIG. 10 depicts the business rules that may be evaluated to determine whether an account is valid, which, when expressed in the rules table, provides the rules table also provided in FIG. 10. In this example, the ruleset describes that an account exists if one of the following scenarios is true: 1) the AccountID exists in the database (line 1 of natural language equivalence) or 2) the userID exists in the database (line 2) and DisbursementTransactionID is not invalid (line 3). Thus, in this case, lines 1 through 3 of written business rule are the equivalent to rules 1 through 3 in the rules table. MRU_RULE_LEVEL provides the level for which a rule should be evaluated. In this case, the first level corresponds to the first scenario above while the second level corresponds to the second scenario. MRU_RULE_SEQ defines the sequence in which the rules should be evaluated. MRU_FIELD_ID identifies the variable or field that is to be evaluated (e.g., "770" for the data of the AccountID). MRU_OPERAND defines the comparison to perform between the data of the identified data field in MRU_FIELD_ID and MRU_FIELD. MRU_VALUE_TYPE defines the data type of MRU_VALUE data field. A person of ordinary skill in the art at the time of the invention would recognize that the tables, including the format of the table and the columns contained therein, depicted in FIGS. 7-10 are used for exemplary purposes and that other formats and columns may be used to define business rules, rulesets and execute-rulesets. Indeed, in certain embodiments, the system may execute business rules using additional types of tables or using only 1 or two types of tables.

At 1120, the result of the "ACCOUNT_VALID" ruleset is returned. Based on this result, at 1124, procedures are executed and/or messages are returned to the user according to the execute-ruleset entry. In this example, the account is determined to be valid and the load_account_details(AccountID) is invoked, causing account 1234 from the database to be retrieved.

At 1124, the next ruleset-execute entry is identified, if any. In one embodiment, each ruleset-execute entry is associated with one or more ruleset-execute-group such that a plurality of ruleset-execute entries may be performed in succession. In these embodiments, the tables may contain an entry defining the sequence of execution for a given ruleset-execute-group. In these embodiments, ruleset-execute-groups objects are referenced when processing service requests.

The externalized nature of the rules allows for rules to be easily accessed by an administrator (and in one embodiment, the client) for modifications as desired, thereby making it also easy to create new rules based on business rules. The use of the metadata-driven rules allows for procedures that have been coded to be repeatedly invoked by any number of rules, as desired. Furthermore, with this structure, procedures that are required to be invoked are centrally located, making it a cost efficient task to modify existing code while avoiding code fragmentation.

Figure 12:
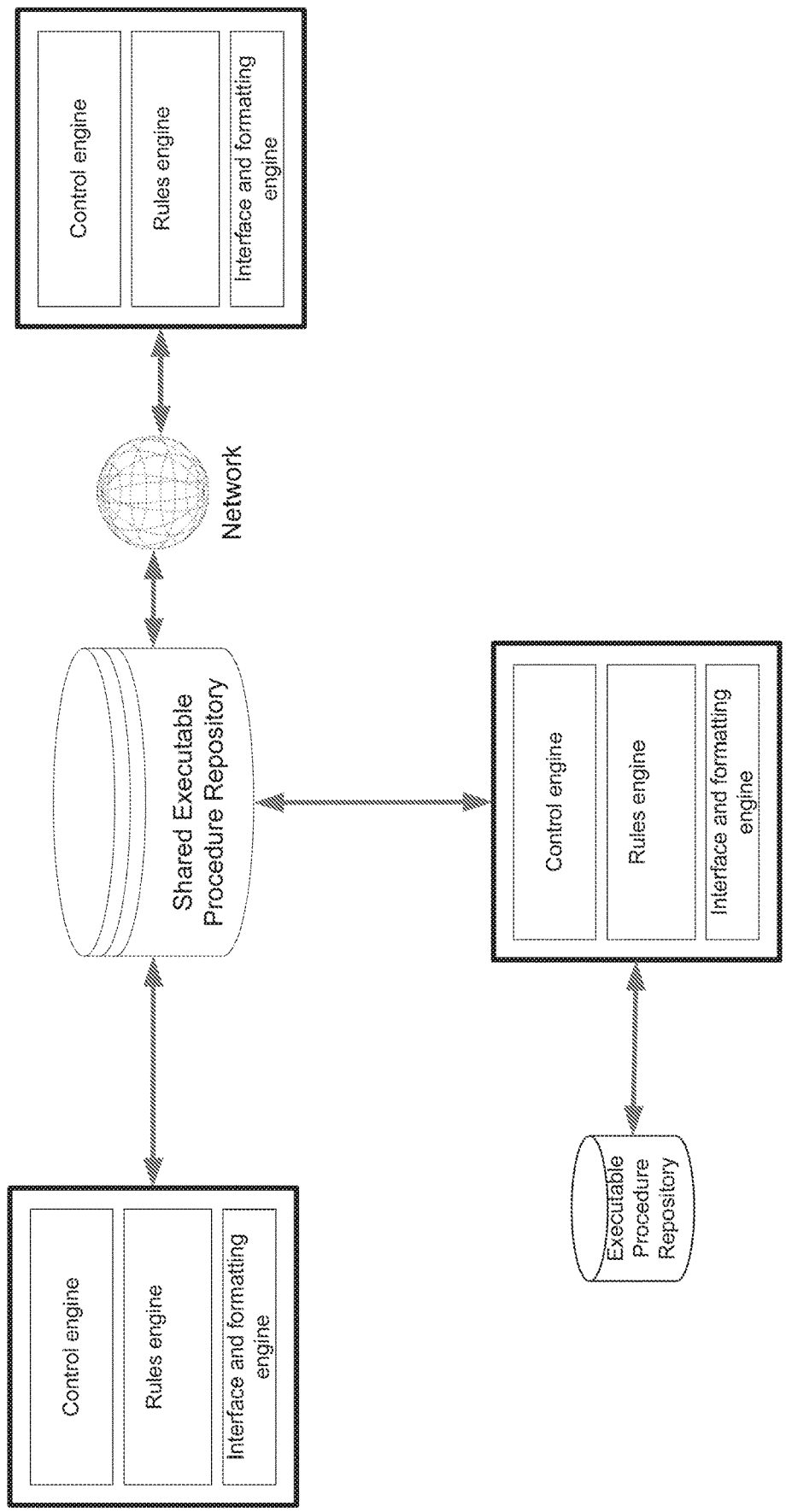
FIG. 12 is a block diagram of a working environment of a plurality of business mainframe systems for content publication and service processing in accordance with an embodiment of the present invention.

In one embodiment of the present invention, further efficiency can be achieved by allowing for the use of the procedures stored at the procedure repository to be accessible across systems. In some of these embodiments, procedures may be shared amongst other systems also operating embodiments of the present invention. For example, as seen in FIG. 12, a plurality of systems utilizing embodiments of the presently disclosed embodiments may have access to a common database, procedure repository. This feature may be further extended systems operating on the logical partitions. That is, this feature can be extended to a server system that is implementing a plurality of logical partitions (LPARs). Functions may be shared amongst the systems supporting the framework provided by embodiments of the present invention. These systems, in one embodiment, are systems that share the same logical partition, but in at least one embodiment, may also be located in different logical partitions. Each of these systems may, for instance, perform different business functions (e.g., one system is configured to service cash management service requests while a second system configured to service escrow services).

As discussed above, embodiments of the present invention provide services to a plurality of businesses. As part of these services, the system manages and provides access to business records. Clients accessing the services of the system may create, read, update and delete records that are stored and managed at databases of the system (e.g., database 124 of system 100 in FIG. 1). Embodiments provide several additional features that can be implemented within the framework to provide a number of business benefits. In one embodiment, the system further provides Application Programming Interfaces (APIs) to extend the architecture with customized auditing, rules and communication formats according to specific business needs.

In one embodiment of the system, embodiments of the present invention further include an auditing engine that allows for efficient auditing of single or multiple record updates. An administrator of a client may access the business records stored and managed by the system and review changes to records that have been entered. In one embodiment, the administrator may create new business rules and evaluate the changes that have been entered at the system based on this new (or existing) business rules. In one embodiment of the present invention, a dual control update functionality is implemented to ensure that data modifications to records are verified before they are saved within the database. In this embodiment, when a user retrieves and modifies a record (e.g., a record in database 124), the modifications are not applied to the record stored in database 124 until a verifier authorizes the change. The verifier may receive notification of the request for verification and may be able to compare the versions of the records that are modified. The modified records may be stored at a temporary portion of memory in the database until authorization is received.

A verifier may perform a mass verification on some or all of the verification requests. In one embodiment, the verification may be defined based on a specific change that was entered or based on attributes of the record. Whether a particular business function requires authorization at all may be configurable by an administrator of the system or an authorized user at the client system.

In another embodiment of the present invention, modifications can be made to a plurality of records with just one modification. In other words, when a user makes a modification to a record, he may also designate the same change may be made to any number of records. The user may define the records to which the change would be applied by defining the attributes of the records to be changed or by specifically identifying the records. In these embodiments, business rules that are applicable to such records are applied at the same time to ensure their compliance. Furthermore, in at least one embodiment, a user has the ability to remove a record from the account composition while continuing to process the rest of the records.

Another feature of embodiments of the invention is the ability to provide a map stream. Using this feature, an administrator of the system or an authorized user at the client system may cause the system to generate a dynamic map stream that depicts the data elements that are processed and/or retrieved in providing a response to one or more service requests at the system. The data elements that are displayed on the dynamic map stream, for instance, may include data fields, rules, rulesets, executed-rulesets, and parameters. For instance, data fields from Data entry screens (credit line update, customer alert update, transaction approval), Help Screens, Metadata update screens for default business rules may be depicted.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer system for publishing business content using a metadata framework, the system comprising:
 a processor;
 an interface and formatting engine configured for
  identifying data to be captured related to a service in one or more data fields on a user interface to be generated for a service request, identifying extraneous data for the service request based on client communication preference data, and discarding extraneous data fields for the extraneous data on the user interface to be generated for the service request, and
  dynamically providing the user interface based on the service request, such that different user interfaces have different number of fields for entry according to the service request received and the client communication preference data; and
 a control engine for performing, using the processor, at least the following operations:
  dynamically defining, according to a request type of the service request and a business rule associated with the service request, a communication memory area and a user interface memory area within a memory operably connected to the processor for processing the service request, when a data value for a target data field is allowed to be entered for the dynamically defined communication memory area and the user interface memory area;
  selecting at least one executable code module from a code module repository storing executable code modules, the selecting based on the business rule selected based on the service request;
  executing the selected business rule based on the service request by executing the at least one executable code module selected from the code module repository;
  storing, at the defined communication memory area, execution data relating to the execution of the selected business rule, wherein the control engine is configured to access the execution data during processing of the service request; and
  generating at least a portion of the user interface for display at a client system based at least on data stored at the defined communication memory area, the user interface comprising a transaction interface including
   a financial transaction field,
   an amount-of-transaction field,
   a payee field,
   a payor field that identifies a payor with respect to a specific transaction, and
   a date field,
 wherein the control engine is configured to concurrently process, using the processor, a plurality of service requests from computer systems of at least two clients.

2. The computer system of claim 1, wherein the business rule is processed based on at least one of the type of the service request and the service request.

3. The computer system of claim 1, wherein the control engine further performs the following operations:
 storing a result of the executing of the business rule in the defined communication memory area;
 executing a second business rule based on the service request and causing the processor to execute at least one executable code module from the code module repository; and
 storing a result of the executing of the second business rule in the defined communication memory area.

4. The computer system of claim 1, further comprising:
 a business rule repository for storing business rules, wherein the business rule repository and the code module repository are stored in separate portions of non-transitory computer memory.

5. The computer system of claim 1, wherein the processing of the service request comprises:
 selecting a business ruleset based on the service request, the business ruleset defining a plurality of business rules; and
 processing the plurality of business rules defined by the selected business ruleset.

6. The computer system of claim 5, wherein the business ruleset and the business rules are defined by metadata tables, and wherein the business ruleset is selected based on an execute-ruleset table.

7. The computer system of claim 1, wherein
 the code module repository is accessible by at least one external system for execution of at least one executable code module based on a service request received at the at least one external system, and
 the computer system and the at least one external system are operating on a common logical computer partition.

8. The computer system of claim 1, further comprising:
 a business rule repository for storing business rules;
 a records database for storing business records;
 an auditing engine for auditing the business records based on one or more of the following:
  one of the business rules; and
  a user-defined rule.

9. The computer system of claim 8, wherein the service request is a request to modify a business record from a first user, and wherein the control engine further performs the step of modifying the business record stored at the records database upon receiving a verification authorization from a verifying user.

10. The computer system of claim 9, wherein the computer system further generates a dynamic list of data elements generated for each service request received at the computer system.

11. The computer system of claim 1, wherein the interface and formatting engine is also configured to identify service-request data of services including automated clearing house services, check disbursements, cross-currency payment services, electronic payables, healthcare links for payers, order-to-pay services, payment fraud prevention services, prepaid cards, self-serve inquiries, resolution management, documentary collections, open account processing, purchase order management, trade document preparation, bank payment obligations, bank-to-bank reimbursements, standby letters of credit, cash consolidation, and financial investments in the one or more data fields of the service request.

12. The computer system of claim 1, wherein
the interface and formatting engine identifies
data of the service request which defines
the type of the service request, and
data required to fulfill the service request,
and
the control engine generates at least a portion of the user interface displaying the data fields identified in the service request for display at the client system based at least on data stored at the defined communication memory area and based on the service request.

13. A method for publishing business content using a metadata framework, the method comprising:
identifying data to be captured related to a service in one or more data fields on a user interface to be generated for a service request, identifying extraneous data for the service request based on client communication preference data, and discarding extraneous data fields for the extraneous data on the user interface to be generated for the service request;
dynamically providing the user interface based on the service request, such that different user interfaces have different number of fields for entry according to the service request received and the client communication preference data;
dynamically defining, according to a request type of the service request and a business rule associated with the service request, a communication memory area and a user interface memory area within a memory for processing the service request, when a data value for a target data field is allowed to be entered for the dynamically defined communication memory area and the user interface memory area;
selecting at least one executable code module from a code module repository storing executable code modules, the selecting based on the business rule selected based on the service request;
executing the selected business rule based on the service request by executing the at least one executable code module selected from the code module repository;
storing, at the defined communication memory area, execution data relating to the execution of the selected business rule, wherein the control engine is configured to access the execution data during processing of the service request;
generating at least a portion of the user interface for display at a client system based at least on data stored at the defined communication memory area, the user interface comprising a transaction interface including
a financial transaction field,
an amount-of-transaction field,
a payee field,
a payor field that identifies a payor with respect to a specific transaction, and
a date field; and
concurrently processing a plurality of service requests from computer systems of at least two clients.

14. The method of claim 13, wherein the business rule defines a business assessment and the at least one executable code module for execution, the method further comprising a step of selecting the at least one executable code module for execution in response to the business assessment, wherein the business rule is processed based on at least one of the type of the service request and the service request.

15. The method of claim 13, further comprising:
storing business rules at a business rule repository, wherein the business rule repository and the code module repository are stored in separate portions of non-transitory computer memory.

16. The method of claim 13, wherein the processing of the service request comprises:
selecting a business ruleset based on the service request, the business ruleset defining a plurality of business rules; and
processing the plurality of business rules defined by the selected a business ruleset, wherein the business ruleset and the business rules are defined by metadata tables, and the business ruleset is selected based on an execute-ruleset table.

17. The method of claim 13, further comprising:
providing at least one executable code module stored at the code module repository to at least one external system for execution based on a service request received at the at least one external system.

18. The method of claim 13, further comprising:
storing business rules in a business rule repository;
storing business records at a records database; and
auditing the business content based on one or more of the following:
one of the business rules; and
a user-defined rule.

19. The method of claim 18, wherein the service request is a request to modify a business record from a first user, wherein the modifying of the business record stored at the records database is performed upon receiving a verification authorization from a verifying user.

20. The method of claim 19, further comprising generating a dynamic list of data elements generated for each received service request.

21. The method of claim 13, further comprising:
storing a result of the executing of the business rule in the defined communication memory area;
executing a second business rule based on the service request and causing the processor to execute at least one executable code module from the code module repository; and
storing a result of the executing of the second business rule in the defined communication memory area.

22. A computer system for publishing business content using a metadata framework, the system comprising:
a processor;
an interface and formatting engine configured for:
identifying
service-request data of a service request for
cash management services,
liquidity transaction services,
commercial financial card services, and
escrow services,
in one or more data fields on a user interface to be generated for the service request, identifying extraneous data for the service request based on client communication preference data, discarding extraneous data fields for the extraneous data on the user interface to be generated for the service request, dynamically providing the user interface based on the service request, such that different user interfaces have different number of fields for entry according to the service request received and the client communication preference data; and a control engine for performing, using the processor, at least the following operations:

dynamically defining, according to a request type of the service request and a business rule associated with the service request, a communication memory area and a user interface memory area within a memory operably connected to the processor for processing the service request, when a data value for a target data field is allowed to be entered for the dynamically defined communication memory area and the user interface memory area;

selecting at least one executable code module from a code module repository storing executable code modules, the selecting based on the business rule selected based on the service request;

executing the selected business rule based on the service request by executing the at least one executable code module selected from the code module repository;

storing, at the defined communication memory area, execution data relating to the execution of the selected business rule, wherein the control engine is configured to access the execution data during processing of the service request; and generating at least a portion of the user interface for display at a client system based at least on data stored at the defined communication memory area, the user interface comprising a transaction interface including a financial transaction field, an amount-of-transaction field, a payee field, a payor field that identifies a payor with respect to a specific transaction, and a date field, wherein the control engine is configured to concurrently process, using the processor, a plurality of service requests from computer systems of at least two clients.

* * * * *